United States Patent [19]
Psenka et al.

[11] 3,803,977
[45] Apr. 16, 1974

[54] METHOD AND APPARATUS FOR FINISHING GEARS

[75] Inventors: Joseph A. Psenka, Bloomfield Hills; Richard W. Tersch, Grosse Pointe Woods, both of Mich.

[73] Assignee: Lear Siegler, Inc., Santa Monica, Calif.

[22] Filed: July 11, 1972

[21] Appl. No.: 270,678

[52] U.S. Cl. .................................... 90/1.6, 90/10
[51] Int. Cl. ............................................ B23f 19/08
[58] Field of Search .................... 90/1.6, 7, 8, 10

[56] References Cited
UNITED STATES PATENTS
2,282,193  5/1942  Lambrix ................................. 90/10
3,651,738  3/1972  Bregi ..................................... 90/10
520,995  6/1894  Kunz ...................................... 90/10

*Primary Examiner*—Gil Weidenfeld
*Attorney, Agent, or Firm*—Whittemore, Hulbert & Belknap

[57] ABSTRACT

A gear finishing operation in which a cutter having a circular array of teeth of the same number and approximate size as that of a gear to be shaved, and having cutting edges at one end of the teeth of identical profile as that to be formed on the gear teeth, the teeth of the cutter being backed off to provide cutting clearance and dimensioned to be received simultaneously in all of the tooth spaces of the gear with circumferential clearance. Relative reciprocation is provided with timed relative circumferential depth feed to shave first one side and then the other of the gear teeth.

17 Claims, 14 Drawing Figures

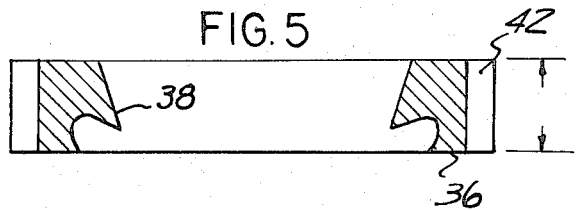
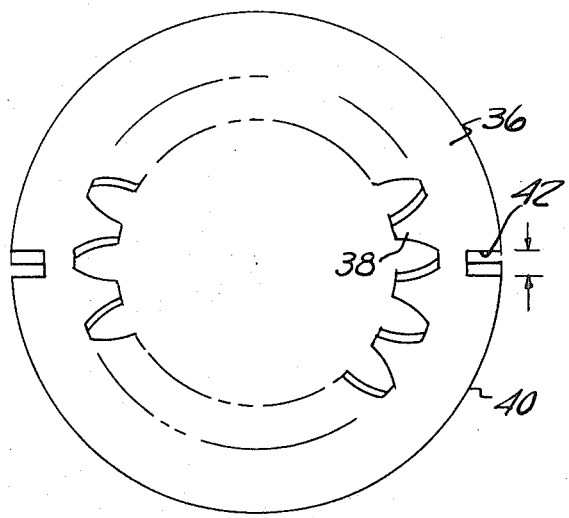
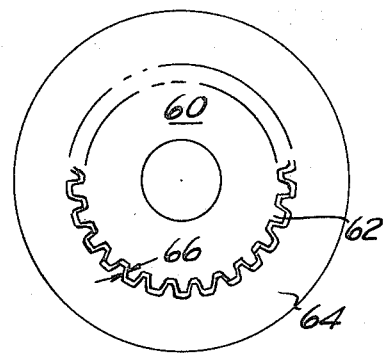
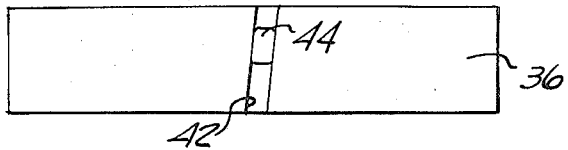
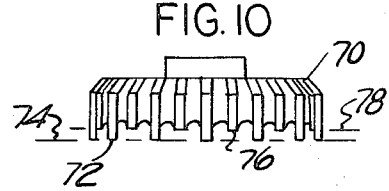
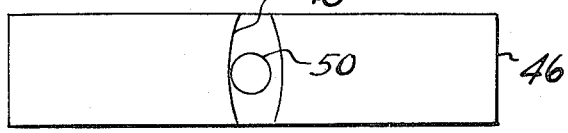
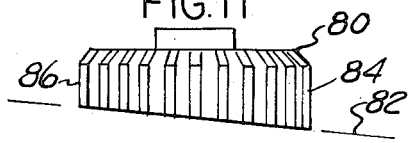
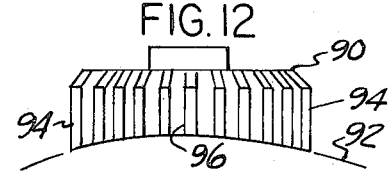
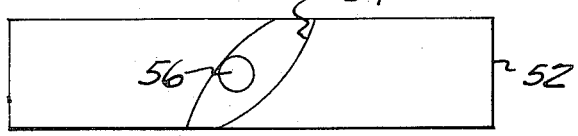
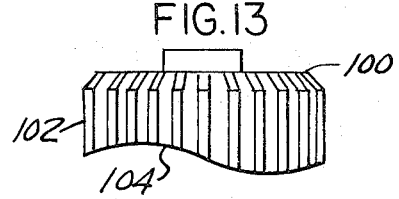
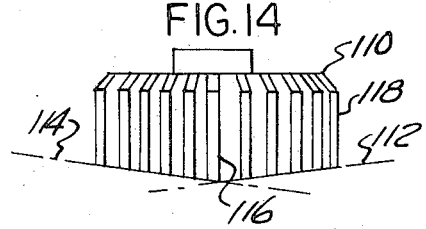

3,803,977

METHOD AND APPARATUS FOR FINISHING GEARS

BRIEF SUMMARY OF THE INVENTION

The teeth of a work gear are finished by an operation in which the profiles of the teeth are shaved from one end of the teeth to the other, all of the teeth surfaces at one side of the teeth being shaved simultaneously, after which the surfaces at the other side of all teeth are shaved simultaneously.

The foregoing may be accomplished using an internally toothed shaving cutter for shaving the teeth of an external gear, or using an externally toothed tool for shaving the teeth of an internal gear. The operation may be carried out to shave the teeth of spur or helical gears. In addition, a relative rotational movement in timed relation to the cutting stroke may be provided in order to form crowned teeth.

The cutter has a circular array of teeth identical in number to the number of teeth in the gear to be shaved and of approximately the same size although slightly smaller in circumferential dimension or thickness so as to provide circumferential clearance. All of the teeth of the cutter are provided with cutting edges formed by the intersection between one end surface of the teeth and both sides thereof. The sides of the teeth in back of the cutting edge are backed off or relieved to provide cutting clearance. The cutting edges are identical in shape with the desired profile on the teeth of the gear.

The shaving operation is carried out by positioning the cutter coaxially of the gear with the teeth of the cutter in alignment with the tooth spaces of the gear. A relative reciprocation is then provided axially of the gear and cutter of an amplitude sufficient to cause the profile cutting edges of the cutter teeth to move over the corresponding surfaces of the gear teeth from one end thereof to the other. A relative circumferential depth feed is provided, preferably incrementally between the termination of a return stroke and the initiation of a cutting stroke. After corresponding sides of all teeth have been shaved simultaneously to predetermined depth, the direction of relative circumferential feed is reversed and the opposite sides of all gear teeth are shaved simultaneously to the required depth.

The apparatus may include means for guiding the relative reciprocation in such a way as to finish either spur or helical teeth and if desired, to provide a crowned formation to the teeth.

BRIEF DESCRIPTION OF THE DRAWINGS

FIG. 4 is a diagrammatic plan view of a cutter.

FIG. 5 is a transverse sectional view through a cutter.

FIGS. 6, 7 and 8 are side views of cutters showing various guide formations.

FIG. 9 is a plan view showing an externally toothed cutter received in an internal gear.

FIGS. 10–14 are elevational views showing modifications of the cutter of FIG. 9.

DETAILED DESCRIPTION

The present invention is applicable in finish shaving either internal or external gears having either spur or helical teeth, and if desired, provided with crowned or tapered teeth.

Figure 1:
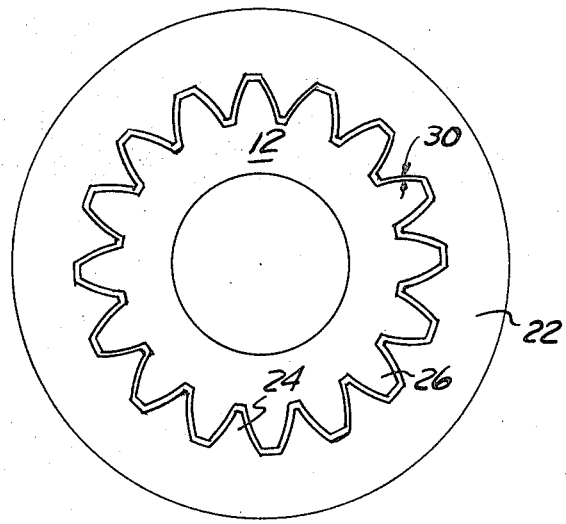
FIG. 1 is a plan view showing an internally toothed cutter matched with an external gear.
Figure 2:
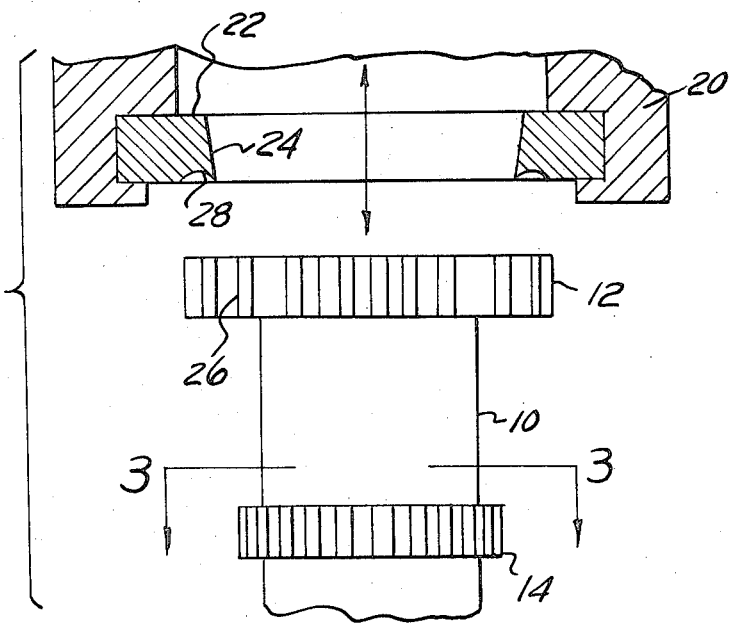
FIG. 2 is a transverse sectional view through the cutter, showing its operative relationship to the work support.
Figure 3:
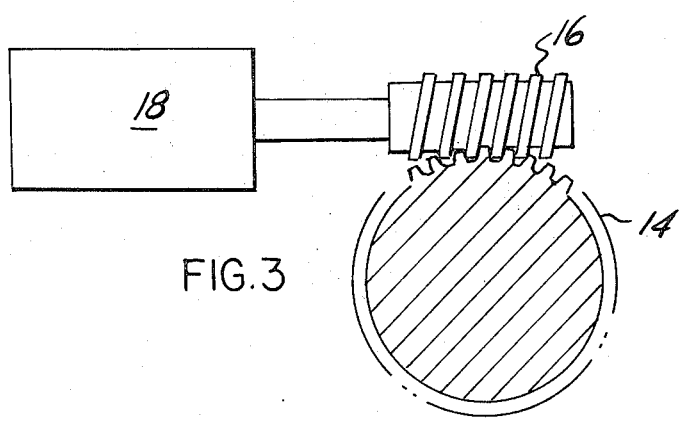
FIG. 3 is a diagrammatic sectional view on the line 3—3, FIG. 2.

Referring first to FIGS. 1–3 there is shown a work support 10 adapted to support a work gear 12 thereon in fixed position but for rotation about its axis, which in the illustrated position is vertical. The rotary work support 10 is provided with means for effecting a controlled rotation thereof and this means is diagrammatically indicated as comprising a worm gear 14 in mesh with a worm 16 adapted to be driven from a motor 18. Mounted above the work support 10 is a vertically movable tool support 20 which is herein illustrated diagrammatically as carrying a finish shaving cutter 22.

The cutter 22, which is diagrammatically indicated in FIG. 1, has a multiplicity of radially inwardly extending teeth 24 equal in number and approximate size to the teeth 26 of the work gear 12. The teeth 24 are provided with cutting edges formed by the intersection between the side surfaces of the teeth and the front face thereof. The front face of the teeth, as best indicated in FIG. 2, is provided with an inclined surface 28 and it will be understood that the sides of the teeth are backed off as conventional to provide cutting clearance.

The cutting edges of the cutter teeth are formed with the identical profile, involute or otherwise, desired to be formed on the teeth of the gear 12. In use the cutter 22 and the gear 12 are positioned in coaxial relationship and the tooth thickness of the front or cutting end of the teeth 24 of the cutter 22 are of a circumferential dimension at any diameter somewhat less than the circumferential dimension of the tooth space in the gear 12 at the same diameter. Accordingly, when the cutter is first moved over the gear in the relationship suggested in FIG. 1, circumferential clearance exists between the teeth of the cutter and gear as indicated at 30.

In finish shaving spur teeth 26 of the gear 12, as suggested in FIGS. 2 and 3, the tool support 20 may be considered as part of a vertical movable ram which s reciprocated without rotation, and the cutter 22 is held without rotation in the work support 20. Upon reciprocation of the cutter vertically as seen in FIG. 2, the teeth of the cutter move through the tooth spaces of the work gear. A relative circumferential feed is provided, preferably by rotating the work gear through the medium of the worm 16 and worm gear 14. This rotation may be controlled by suitable control circuits for the motor 18 or the motor 18 may be a suitable standard reversible stepping motor and may be such as to position a cutting edge at one side of all of the teeth of the cutter 22 in proper relation to take a small cut in the same sides of all teeth of the gear at the first stroke. Preferably, on the back stroke the motor is slightly reversed to introduce clearance to avoid causing the cutting edges at the ends of the cutter teeth to drag over the cut surface. Prior to initiation of the succeeding cut the motor 18 is again reversed to provide a slight incremental feed to position the cutter for a second cutting stroke at a slightly increased depth.

It will be observed that this operation provides a full form finishing cut over the entire surface at one side of all of the gear teeth. A very few successive cuts will be sufficient to provide the proper formation and correction of errors at one side of all of the teeth.

Thereafter, prior to initiation of a successive cutting stroke, the motor 18 is reversed through a predetermined degree of movement to position the cutter teeth 24 in position to initiate cutting at the opposite sides of all of the gear teeth 26. The operation is then continued through a few strokes until the other side of the gear teeth has likewise been finished to the required accuracy.

Referring now to FIGS. 4–8 there is diagrammatically indicated arrangements for cutting helical teeth and for crowning either spur or helical teeth. In FIGS. 4 and 5 there is shown a cutter 36 having internal cutting teeth 38 which may be identical with the teeth 24 previously described except that they are disposed at a helix angle in accordance with the desired helix angle to be formed on the teeth of the gear. The otherwise cylindrical outer surface 40 of the cutter is provided at opposite sides with helically extending slots 42, these slots being also indicated in FIG. 6.

The cutter 36 may be reciprocated vertically by a suitable holder, such for example as the holder indicated diagrammatically at 20 in FIG. 2, except that in a stationary position adjacent the path of movement of the cutter there are provided guide fingers 44 which extend into the inclined slots 42. Where this construction is provided in association with the holder 20 illustrated in FIG. 2, it will of course be apparent that suitable gaps in the holder are provided to permit the fingers 44 to extend into the inclined slots. Accordingly, upon vertical reciprocation of the holder, the cutter 36 will be given equivalent vertical movement upon which is superimposed a circumferential or rotational movement dependent upon the inclination of the guide slot 42. This of course will cause the cutting teeth of the cutter to move in a helical path which is chosen to correspond precisely to the helical arrangement of the teeth of the external gear with which the cutter 36 is associated.

Instead of providing an inclined slot 42, a cutter 46 may be provided with a slot 48 adapted to receive a guide pin 50. The opposite sides of the guide slot 48 are oppositely curved, and generally arcuate or at least curvilinear and upon vertical movement of the cutter 46 with respect to the stationary guide pin 50, will cause a back and forth increment of rotation of the cutter during the cutting stroke. This will provide a crowning configuration on spur teeth. The cutter is rotationally biased as by spring means into engagement with one side or the other of slot 48, according to which side of the gear teeth is being shaved.

A cutter 52, illustrated in FIG. 8, is similar except that the guide slot 54 associated with a stationary guide pin 56 is inclined so that the motion imparted to the cutter 52 corresponds generally to the disposition of helical teeth on the gear but the oppositely curved shape of the guide slot 54 at opposite sides thereof is adapted to provide a back and forth increment of rotation which will provide a crowned configuration on the generally helical teeth of the work gear. Again, the cutter is rotationally biased in one direction while cutting one side of the teeth in the opposite direction while cutting the other side. The sides of the slots 48 and 54 may be concave, or convex.

Referring now to FIG. 9 there is diagrammatically illustrated an arrangement in which the cutter, here designated at 60, has external teeth 62 adapted to be received within tooth spaces of an internally toothed work gear 64 with initial clearance as indicated at 66.

In general terms, the operation of this cutter is exactly the same as of the internally toothed cutter previously described. The teeth of the cutter again are provided with cutting edges at one end and the sides of the teeth are backed off to provide cutting clearance. Again, suitable camming means equivalent to the guide slots described in conjunction with FIGS. 5–8, may be employed to provide either helical movement or crowning movement or both of the cutter, the teeth of the cutter being inclined where the finishing action is imparted to a helical gear.

In FIGS. 10–14 there is illustrated an arrangement of teeth, provided for the purpose of eliminating simultaneous contact of all of the teeth of the cutter with the ends of the teeth of the work gear. It will of course be understood that the modification illustrated in FIGS. 10–14 in connection with an external cutter is equally applicable to an internally toothed cutter such as illustrated at 22 in FIG. 1.

Referring first to FIG. 10 the cutter 70 is provided with a multiplicity of teeth 72, the cutting faces of which are located symmetrically with respect to a plane 74 perpendicular to the axis of the cutter. The remaining teeth 76, which in this Figure are illustrated as alternate teeth each of which is interposed between one of the teeth 72, are all located symmetrically with respect to a second plane 78 which is spaced axially from the plane 74. Accordingly, upon initiation of a cutting stroke, which is downwardly as seen in FIG. 10, alternate teeth 72 will initially contact the teeth of the work gear, and upon further movement thereof the remaining teeth 76 will contact the teeth of the work gear. This will reduce the impact and will produce a much smoother and more efficient cutting operation.

Referring now to FIG. 11 the cutter 80 has the cutting teeth located symmetrically with respect to an inclined plane 82. With this arrangement the teeth having the maximum axial extent as indicated diagrammatically at 84, will contact the teeth of the work gear first and the action of the teeth will extend progressively around the cutter in both directions until the tooth 86 having the minimum axial extension engages the work piece. This arrangement has the objection that the cutting action is not balanced around the cutter.

Referring now to FIG. 12 the cutter 90 has the teeth arranged symmetrically with respect to a cylindrical surface 92 so that teeth 94 at opposite sides of the cutter engage initially and the cutting action extends progressively from tooth to tooth to the diametrically opposed teeth one of which is illustrated at 96.

In FIG. 13 a somewhat different arrangement is illustrated for the cutter 100, the ends of the teeth 102 being arranged in a sinuous curve 104 so that the cutting edge extends progressively from the longer teeth toward the shorter teeth.

FIG. 14 shows a cutter 110 in which the ends of the teeth at one side thereof are located symmetrically with respect to a plane 112 and the teeth at the other side of the cutter are located symmetrically with respect to a plane 114. With this arrangement teeth 116 at diametrically opposite sides of the cutter engage the work equally and the cutting action extends progressively from these teeth toward the teeth 118 located at 90° from the teeth 116.

It will of course be understood that the inclination of the faces of teeth, or rake, as well as the back-off angle must be taken into account to provide a cutting edge shaped to produce the correct profile on the gear teeth. This results in a cutting edge whose projection into a plane perpendicular to the advance of the tooth cuts the groove or space to the required shape. This may be called the effective or cutting profile of the tooth.

It is also to be understood that it is not sufficient to initially provide identical teeth with the cutting edges all located symmetrically with respect to a single plane perpendicular to the axis, and then to grind the front faces of some of the teeth to provide the sequential cutting. Due to back-off, this would produce thinner teeth toward the rear of the tool, which would not produce the required dimensions and tooth spacing on the gear.

The individual tooth form must be designed, taking into account tooth location, so that originally and as reground, proper tooth form and spacing in the work gear will be maintained.

What we claim as our invention is:

1. The method of finish shaving gear teeth, which comprises positioning a gear shaving cutter coaxially of a work gear, the cutter having a circular array of teeth of the same number and approximate size as that of the gear to be shaved and having cutting edges at opposite sides at the same ends of the teeth of the identical effective profile as that to be formed on the gear teeth, the teeth of the cutter being backed off at both sides to provide cutting clearance, and dimensioned to be received simultaneously in all the tooth spaces of the gear with circumferential clearance, providing a relative axial reciprocation consisting of cutting and return strokes between the cutter and gear of an amplitude slightly exceeding the thickness of the gear to move the cutting edges over the full length of the gear teeth into clearance at each end of the strokes, and providing a positive relative circumferential depth feed in the same direction at the end of each return stroke to determine the depth of cut during the following cutting stroke, and providing a reverse relative circumferential movement between the gear and cutter at the end of each cutting stroke to provide clearance between the gear and cutter during the return strokes.

2. The method as defined in claim 1 which comprises providing the relative reciprocation by reciprocating the cutter.

3. The method as defined in claim 2 which comprises providing the relative circumferential feed by rotating the gear.

4. The method as defined in claim 1 in which the gear is a spur gear, which comprises providing a back and forth relative circumferential movement between the gear and cutter during the cutting stroke to crown the gear tooth surface.

5. The method as defined in claim 1 in which the gear is a helical gear, which comprises providing a continuous relative circumferential movement between the gear and cutter during cutting strokes.

6. The method as defined in claim 1 in which the gear is a helical gear, which comprises providing a back and forth relative circumferential movement between the gear and cutter during the cutting stroke to crown the gear tooth surface.

7. The method as defined in claim 1 in which the cutting edges provided at the ends of the cutter teeth are spaced unequally from a plane perpendicular to the axis of the cutter, and which comprises initiating the cutting action of the cutter teeth sequentially.

8. The method as defined in claim 7 in which the cutting teeth of adjacent teeth are spaced progressively from a plane perpendicular to the cutter axis, and which comprises initiating cuts progressively.

9. Gear finishing apparatus comprising a rotatable work support for a gear member, a cutter support for a gear-like cutter member coaxial with said work support, means connected to one of said supports to reciprocate it axially in cutting and return strokes of an amplitude to cause cutting edges of a gear-like cutter member to move from end to end of the teeth of a gear member on said work support, and means connected to the other of said supports to positively rotate it incrementally between return and cutting strokes to determine the depth of cut during the following cutting stroke, and to provide a reverse rotation between cutting and return strokes to provide clearance between gear and cutter members during return strokes.

10. Apparatus as defined in claim 9, and means for superimposing a gradual relative rotation between the cutter and gear during reciprocation in timed relation to reciprocation.

11. Apparatus as defined in claim 10 in which the gradual relative rotation is uniform during a cutting stroke to produce helical gears.

12. Apparatus as defined in claim 11 which comprises means for superimposing a gradual relative rotation during reciprocation first in one direction and then in the other on the first mentioned gradual relative rotation to produce crowned helical gears.

13. Apparatus as defined in claim 10 in which the gradual relative rotation is first in one direction and then the other during a cutting stroke to produce crowned teeth.

14. Apparatus as defined in claim 9, comprising cam means operatively associated with the reciprocating support to provide continuous rotation of the member supported thereby during reciprocation thereof in timed relation to its reciprocation.

15. Apparatus as defined in claim 14 in which said cam means comprises a helically inclined cam and follower.

16. Apparatus as defined in claim 14 in which said cam means comprises a cam surface elongated in the direction of reciprocation and of longitudinally curved form to provide crowned surfaces on the teeth of the gear member, and a follower engaging said surface.

17. Apparatus as defined in claim 14 in which said cam means comprises a generally helically inclined cam surface elongated in the direction of reciprocation and of longitudinally curved form to provide crowned helical surfaces on the teeth of the gear member, and a follower engaging said surface.

* * * * *